(12) United States Patent
Sharma

(10) Patent No.: US 7,683,835 B2
(45) Date of Patent: Mar. 23, 2010

(54) SYSTEM AND METHOD FOR LOCATING WIRELESS DEVICES

(75) Inventor: Navin Kumar Sharma, Amherst, MA (US)

(73) Assignee: Computer Associates Think, Inc., Islandia, NY (US)

( * ) Notice: Subject to any disclaimer, the term of this patent is extended or adjusted under 35 U.S.C. 154(b) by 147 days.

(21) Appl. No.: 11/839,336

(22) Filed: Aug. 15, 2007

(65) Prior Publication Data

US 2008/0042898 A1   Feb. 21, 2008

Related U.S. Application Data

(60) Provisional application No. 60/822,464, filed on Aug. 15, 2006.

(51) Int. Cl.
*G01S 3/00* (2006.01)
(52) U.S. Cl. ..................................... 342/458
(58) Field of Classification Search ................. 342/458, 342/463–465
See application file for complete search history.

(56) References Cited

U.S. PATENT DOCUMENTS

| | | | | |
|---|---|---|---|---|
| 6,865,395 | B2* | 3/2005 | Riley | 342/464 |
| 2002/0045455 | A1* | 4/2002 | Spratt | 455/456 |
| 2003/0197645 | A1* | 10/2003 | Ninomiya et al. | 342/464 |
| 2005/0195109 | A1* | 9/2005 | Davi et al. | 342/463 |
| 2006/0071854 | A1* | 4/2006 | Wilcox | 342/458 |
| 2006/0125694 | A1* | 6/2006 | Dejanovic et al. | 342/463 |
| 2007/0290924 | A1* | 12/2007 | McCoy | 342/464 |

OTHER PUBLICATIONS

M.J. de Smith et al., Geospatial Analysis: A Comprehensive Guide to Principles, Techniques and Software Tools, section "Polygon centroids and centers", 2006.*
Liu, et al., "Sensor Localization with Ring Overlapping Based on Comparison of Received Signal Strength Indicator," *In Proceedings of IEEE International Conference on Mobile Ad-hoc and Sensor Systems (MASS)*, Florida, USA, Oct. 2004.
Guvenc, et al., "Enhancements to RSS Based Indoor Tracking Systems Using Kalman Filters," *Proceedings of GSPx and International Signal Processing Conference (ISPC)*, Dallas, TX, USA, Mar. 31-Apr. 3, 2003.
Murphy, "Kalman Filter Toolbox—Tutorial," http://www.cs.berkeley.edu/~murphyk/Bayes/kalman.html. Updated Jun. 7, 2004, downloaded Aug. 14, 2007.
Marc de Jonge, "Benchmarking Various Untrained Localization Algorithms," *3rd Twente Student Conference on IT*, Enschede, Jun. 2005.
Youssef, et al., "The Horus WLAN Location Determination System," *Proceedings of the Third International Conference on Mobile Systems, Applications, and Services (MobiSys 2005)*, Seattle, WA, USA, Jun. 2005.

(Continued)

*Primary Examiner*—Thomas H Tarcza
*Assistant Examiner*—Fred H Mull
(74) *Attorney, Agent, or Firm*—Baker Botts L.L.P.

(57) ABSTRACT

A system and method for locating a wireless device includes estimating respective distances between a wireless device and each of a plurality of access points, based upon respective signal strengths of a plurality of signals received by the wireless device from the plurality of access points. The location of the wireless device is estimated based upon the estimated respective distances and position information of the access points.

17 Claims, 6 Drawing Sheets

OTHER PUBLICATIONS

Youssef, et al., "Continuous Space Estimation for WLAN Location Determination Systems," *IEEE Thirteenth International Conference on Computer Communications and Networks*, Chicago, IL, USA, Oct. 2004.

Bahl, et al., "Radar: An In-Building RF Based User Location and Tracking System," *Proceedings of IEEE INFOCOM 2000*, Tel-Aviv, Israel, Mar. 2000.

Prasithsangaree, et al., "On Indoor Position Location with Wireless LANs," *The 13th IEEE International Symposium on Personal, Indoor and Mobile Radio Communications*—PIMRC 2000, Sep. 2002.

Kumar, et al., "Improving the Accuracy of Wireless LAN Based Location Determination Systems Using Kalman Filter and Multiple Observers," *In Wireless Communications and Networking Conference (WCNC)*, Las Vegas, NV, USA, Apr. 2006.

Ghassemzadeh, et al., "An Empirical Indoor Path Loss Model for Ultra-Wideband Channels," *Journal of Communication and Networks*, Dec. 2003, vol. 5, No. 4, pp. 303-308.

Gwon, et al., "Robust Indoor Location Estimation of Stationary and Mobile Users," *Proceedings of IEEE INFOCOM 2004*, Hong Kong, China, Mar. 2004.

\* cited by examiner

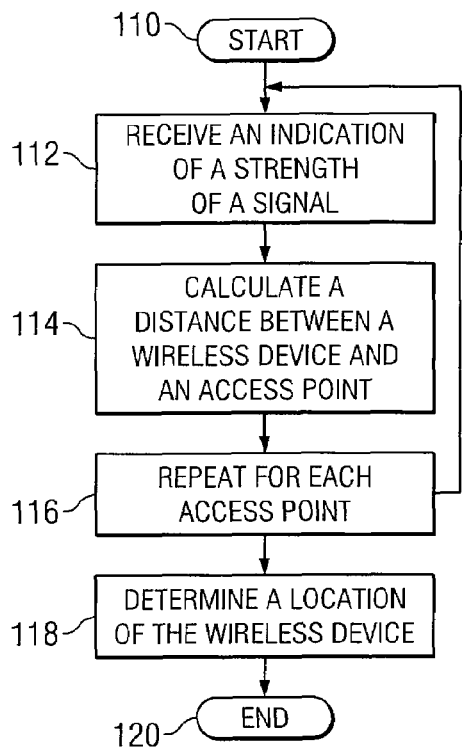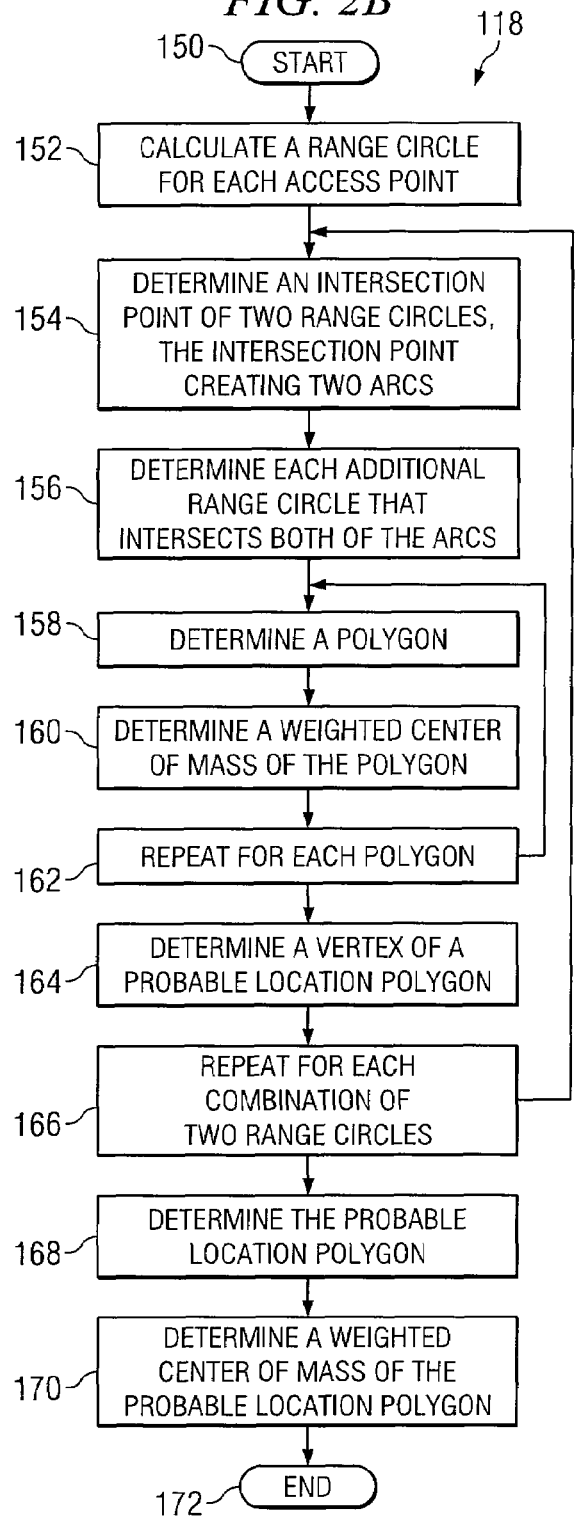

AVERAGE ERROR VS. POSITION NUMBER (FOR 8 APs: A1 TO A8, TRANSMIT POWER OF AP's: 15dBm, ML COND.,)

AVERAGE ERROR VS. POSITION NUMBER (FOR 6 APs: A1 TO A6, TRANSMIT POWER OF AP's: 15dBm, ML COND.,)

AVERAGE ERROR VS. POSITION NUMBER (FOR 4 APs: A1 TO A4, TRANSMIT POWER OF AP's: 15dBm, ML COND.,)

AVERAGE ERROR VS. POSITION NUMBER (NO LOAD CONDITION)

AVERAGE ERROR VS. POSITION NUMBER (MEDIUM LOAD CONDITION)

AVERAGE ERROR VS. POSITION NUMBER (HEAVY LOAD CONDITION)

AVERAGE ERROR IN ESTIMATION VS. NUMBER OF ACCESS POINTS

AVERAGE ERROR IN ESTIMATION VS. NUMBER OF ACCESS POINTS

SYSTEM AND METHOD FOR LOCATING WIRELESS DEVICES

CROSS-REFERENCE TO RELATED APPLICATIONS

This application claims benefit under 35 U.S.C. § 119(e) to U.S. Provisional Application Ser. No. 60/822,464 filed Aug. 15, 2006 by Sharma, and entitled A Weighted Center of Mass Based Trilateration Approach For Locating Wireless Devices in Indoor Environment, which is hereby incorporated by reference.

TECHNICAL FIELD OF THE INVENTION

This invention relates generally to the field of wireless devices and more specifically to a system and method for locating wireless devices.

BACKGROUND OF THE INVENTION

The ability to access a network wirelessly allows a wireless device to change locations while remaining connected to the network. This movement, however, increases the difficulty of determining the location of a wireless device. In particular, determining the location of a wireless device in an indoor environment may be especially difficult.

Despite these difficulties, the ability to locate a wireless device may be required by numerous services and applications. To fulfill this requirement, various methods for determining the location of wireless devices have been proposed. Many of these methods, however, are unable to overcome the difficulties of locating a wireless device.

SUMMARY OF THE INVENTION

According to one embodiment of the present disclosure, a method for locating wireless devices includes estimating respective distances between a wireless device and each of a plurality of access points, based upon respective signal strengths of a plurality of signals received by the wireless device from the plurality of access points. The location of the wireless device may be estimated based upon the estimated respective distances and position information of the access points.

In accordance with a particular embodiment of the present disclosure, the method includes determining, at a managing device, a plurality of polygons, and calculating a weighted center of mass of each polygon of the plurality of polygons. The weighted center of mass of one of the polygons may comprise the probable location of the wireless device.

In accordance with another embodiment of the present disclosure, the method may include calculating a range circle for each access point of the plurality of access points. A plurality of intersection points between two of the range circles may be determined. A weighted midpoint of a chord between the plurality of intersection points may be calculated, and the weighted midpoint may comprise the probable location of the wireless device.

Certain embodiments of the invention may provide one or more technical advantages. A technical advantage of one embodiment may be that the location of a wireless device in an indoor environment may be determined.

A technical advantage of a further embodiment may be that determining a location of a wireless device by using a weighted center of mass based trilateration approach may allow the location of a wireless device to be determined even when the configuration of various access points, is different.

A technical advantage of a further embodiment may be that a Kalman filter may be used when calculating a distance between an access point and a wireless device, and also when determining the location of the wireless device. As a result, the accuracy of the result may be improved.

A technical advantage of a further embodiment may be that the location of a wireless device may be determined even when the calculated range circles do not intersect.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2A is a flowchart illustrating one embodiment of a method for locating wireless devices;

FIG. 2B is a flowchart illustrating one embodiment of a method for performing the step of determining a location of the wireless device of FIG. 2A;

DETAILED DESCRIPTION OF EXAMPLE EMBODIMENTS

Embodiments of the present disclosure and its advantages are best understood by referring to FIGS. 1 through 12 of the drawings, like numerals being used for like in corresponding parts of the various drawings.

Figure 1:
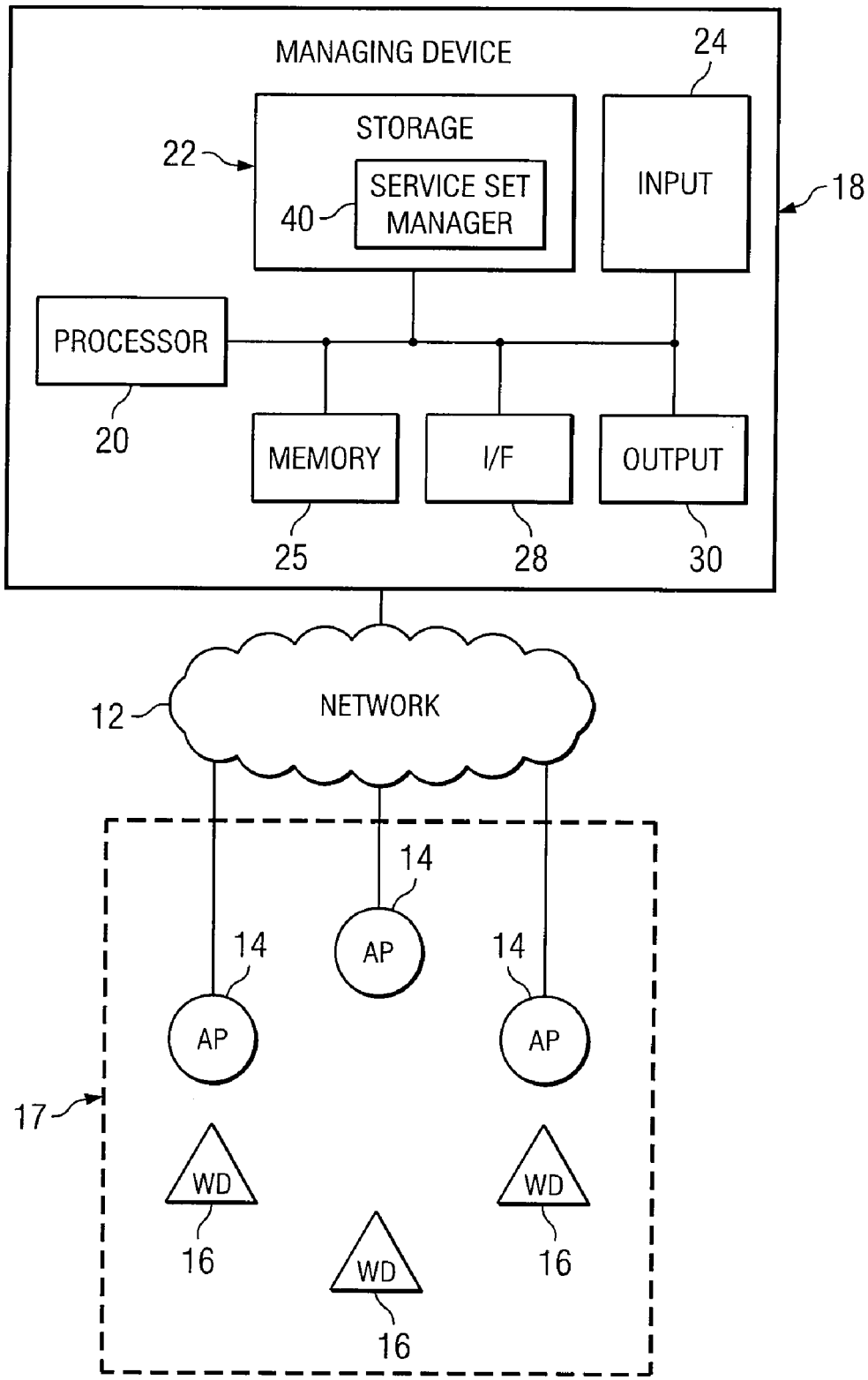
FIG. 1 is a block diagram illustrating one embodiment of a system for locating wireless devices.

FIG. 1 is a block diagram illustrating a system 10 for locating wireless devices according to the teachings of the invention. According to the illustrated embodiment, system 10 generally includes one or more access points 14 and one or more wireless devices 16. In one embodiment, system 10 may locate wireless device 16 using a calculated distance between wireless device 16 and access point 14. In a further embodiment, system 10 may locate wireless device 16 by calculating one or more weighted centers of mass. In another embodiment, system 10 may locate wireless device 16 in an indoor environment.

As shown in FIG. 1, system 10 further includes a network 12, an environment 17, and a managing device 18. Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Network 12 may utilize communication protocols and technologies to transmit packet flows. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, network 12 may utilize the IEEE 802.xx standards such as the IEEE 802.11 standards. In one embodiment, network 12 may utilize IEEE 802.11b wireless LAN.

Access point 14 may be any network point suitable to couple a wireless device to a network. In one embodiment, access point 14 may be any network point suitable to couple wireless device 16 to network 12. Access point 14 may be, for example, a session border controller, gatekeeper, call manager, conference bridge, router, hub, switch, gateway, edge point, or any other hardware or software operable to couple a wireless device to a network. In one embodiment, access point 14 may include a DLink 2100 (v2.00) access point. In another embodiment, access point 14 may be a sensor.

According to one embodiment of the invention, access point 14 may have a wired connection to network 12. According to another embodiment of the invention, access point 14 may have a wireless connection to network 12. According to yet another embodiment of the invention, access point 14 may include a receiver or transmitter, or both a receiver and a transmitter. As an example, access point 14 may include an omni directional antenna operable to communicate with one or more wireless devices. In a further embodiment, access point 14 may be operable to send a radio signal to wireless device 16.

Wireless device 16 may refer to any suitable device operable to communicate with a network through an access point. In one embodiment, wireless device 16 may refer to any suitable device operable to communicate with network 12 through access point 14. Wireless device 16 may execute with any of the well-known MS-DOS, PC-DOS, OS-2,MAC-OS, WINDOWS™, UNIX, or other appropriate operating systems, including future operating systems. Wireless device 16 may include, for example, a personal digital assistant, a computer such as a laptop, a cellular telephone, a mobile handset, or any other device operable to communicate with a network through an access point. According to one embodiment, wireless device 16 may include a laptop with an Intel PRO/Wireless 2100 wireless network interface card.

In one embodiment, wireless device 16 may be operable to receive a radio signal from access point 14. In another embodiment, wireless device 16 may be further operable to transmit an indication of the strength of the signal received from access point 14.

Environment 17 may be any suitable environment that includes an access point and a wireless device. In one embodiment, environment 17 may be any suitable environment that includes access point 14 and wireless device 16. Environment 17 may be, for example, an indoor environment or an outdoor environment, or a combination of both. In a further embodiment, environment 17 may include a floor of a building, or the entire building.

In another embodiment, environment 17 may include a No Load condition, a Medium Load condition, or a Heavy Load condition. A No Load condition, in one embodiment, may include a condition where no person is located in environment 17. A Medium Load condition, in one embodiment, may include a condition where a normal amount of people are located in environment 17. For example, a Medium Load condition may include a condition where all of the employees of an office building floor are in environment 17. A Heavy Load condition, in one embodiment, may include a condition where environment 17 is crowded with people. For example, a Heavy Load condition may include a condition where eighty or more people are in an environment 17 consisting of one office building floor. According to one embodiment, system 10 may be operable to locate wireless devices in either a No Load condition, a Medium Load condition, or a Heavy Load condition of environment 17.

Managing device 18 represents any suitable device operable to locate wireless devices. Although FIG. 1 provides one example of managing device 18 as operating within network 12, in other embodiments, managing device 18 may operate as a wireless device connecting to network 12 through an access point 14. Furthermore, although FIG. 1 provides one example of managing device 18 as located outside of environment 17, in other embodiments, managing device 18 may be located within environment 17.

According to the illustrated embodiment of the invention, managing device 18 includes a processor 20, a storage device 22, an input device 24, a memory device 26, a communication interface 28, an output device 30, and a service set manager 40.

Processor 20 may refer to any suitable device operable to execute instructions and manipulate data to perform operations for managing device 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both. In one embodiment, communication interface 28 may be operable to transmit the location of wireless devices to any suitable device. In a further embodiment, communication interface 28 may be operable to receive an indication of a strength of signal received by a wireless device.

Output device 30 may refer to any suitable device operable for displaying information to a user. Output device 30 may include, for example, a video display, a printer, a plotter, or other suitable output device. In an embodiment, output device 30 may be operable to display the location of wireless devices.

Service set manager 40 may refer to any suitable logic embodied in computer-readable media, and when executed, that is operable to locate wireless devices. In the illustrated embodiment of the invention, service set manager 40 resides in storage device 22. In other embodiments of the invention, service set manager 40 may reside in memory device 26, or any other suitable device operable to store and facilitate retrieval of data and instructions.

Traditionally, devices capable of accessing a network were connected to that network through a wire. This wire restricted the movement of the device, and thus, made determining the location of the device relatively easy. The popularity of wireless devices, however, has changed this. For example, the ability to access a network wirelessly allows a wireless device, such as wireless device 16, to change locations while remaining connected to the network. This movement, however, increases the difficulty of determining the location of a wireless device. In particular, determining the location of a wireless device in an indoor environment may be especially difficult. For example, in an indoor environment, the configuration of access points, such as access point 14, may not be fixed. This may result in various access points with differing characteristics, such as transmit power. Additionally, the movement of a wireless device in an indoor environment may affect the attenuation of a signal. As a result, modeling a signal propagation in an indoor environment is infeasible.

Despite the difficulties in locating a wireless device, the ability to do so may be required by numerous services and applications. To fulfill this requirement, various methods for determining the location of wireless devices have been proposed. These methods, however, are often unable to overcome the difficulties of locating a wireless device.

FIG. 2A is a flowchart illustrating one embodiment of a method for locating wireless devices. In one embodiment, this method may be performed by managing device 18. In another embodiment, this method may be embodied in a computer-readable media that is operable, upon execution, to locate wireless devices.

The method begins at step 110. At step 112, an indication of a strength of a signal is received. According to one embodiment, the indication may be received by any device operable to locate wireless devices. For example, the indication may be received by managing device 18. In another embodiment, the indication may be received from wireless device 16. For example, the indication may be received from wireless device 16 when wireless device 16 is a managed device. In another embodiment, the indication may be received from a sensor. For example, the indication may be received from a sensor when wireless device 16 is an unmanaged device. In one embodiment, a sensor may be separate from access point 14. In such an embodiment, a sensor may be further operable to track rogue access points. In another embodiment, access point 14 may include a sensor. In a further embodiment, access point 14 may transmit an indication to managing device 18 after receiving the indication from wireless device 16.

According to one embodiment, an indication may include Receive Signal Strength Indication (RSSI). RSSI, in one embodiment, may be a measurement of received radio signal strength. In a further embodiment, RSSI may be measured according to the following equation:

$$RSSI = 10 \log(P) \quad (1)$$

According to an embodiment of the above equation, P may be equal to received power in milliwatts. In another embodiment, RSSI may be measured in dBm. In a further embodiment, the measurement of RSSI may include using a filter capable of removing the measurement noise components and increasing the estimation accuracy. For example, the measurement of RSSI may include using a Kalman filter. In such an embodiment, the Kalman filter may provide a more accurate result when calculating a distance between a wireless device and an access point.

Once the indication is received, the method moves to step 114. At step 114, a distance between a wireless device and an access point is calculated. According to one embodiment, a distance between wireless device 16 and access point 14 may be calculated using the following two equations for Path Loss (PL):

$$PL = FSPL_{REF} + 10 * n * \log_{10}(d) \quad (2)$$

$$PL = P_T - P_R + SITE_{OFFSET} + AP_{OFFSET} + CLIENT_{OFFSET} \quad (3)$$

According to an embodiment of the equations, Path Loss may be the signal attenuation between two locations separated by a distance d. In a further embodiment, n may be the attenuation factor that varies with the indoor medium; $FSPL_{REF}$ may be the path loss calculated at the far-field of the antenna; $P_T$ may be the transmit power of an access point; $P_R$ may be the power received at the wireless device; $SITE_{OFFSET}$ may be the site offset that varies with the structure of the indoor environment; $AP_{OFFSET}$ may be the access point offset that varies with the access point type, its location in the indoor environment, and its antenna orientation; and $CLIENT_{OFFSET}$ may be the wireless device offset that varies with the wireless interface of the device.

In one embodiment, the offsets may be determined. For example, the offsets may be determined from an analysis of the indoor environment. This analysis may be conducted, in one embodiment, by a user. In another embodiment, the offsets may be determined by a device. In a further embodiment, the offsets may be determined empirically by a network administrator.

Once the distance between a wireless device and an access point is calculated, the method moves to step 116. At step 116, steps 112 and 114 are repeated for each access point. In one embodiment, the steps are repeated for every access point 14 that sends a radio signal to wireless device 16.

At step 118, a location of the wireless device is determined. It will be recognized by those of ordinary skill in the art that determining the precise location of the wireless device is difficult. Human error, limitations in data, and imperfections in devices and collected data may contribute to these difficulties. Accordingly, the "location of the wireless device" as used in this application may refer to the precise location, and may refer instead to a "probable" location. A probable location may include, for example, an estimated location, a range, an area (e.g. an office or a floor of a building), or any other suitable indication of a location and/or area in which the wireless device may be located. Furthermore, "probable location" does not necessarily refer to a location in which there is a high probability that the wireless device resides; instead, in a particular embodiment, "probable location" may refer to a best guess estimate of the location of the wireless device, using the data collected and/or provided. One embodiment of step 118 is further discussed in reference to FIG. 2B. At step 120, the method ends.

Although FIG. 2A describes one embodiment of a method for locating wireless devices, the method of FIG. 2A may be performed using any other suitable steps and/or equations. For example, any suitable equation or method for calculating the distance between a wireless device and an access point may be used. Furthermore, the steps of FIG. 2A may be performed in any suitable order and may be performed at substantially the same time.

FIG. 2B is a flowchart illustrating one embodiment of a method for performing the step of determining a location of the wireless device of FIG. 2A. The method begins at step 150.

Figure 3A:
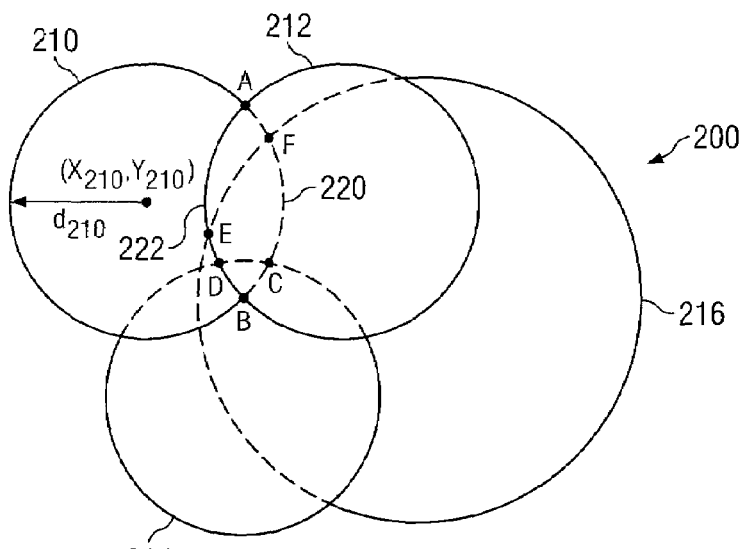
FIG. 3A is a diagram illustrating one embodiment of a plurality of range circles used to locate wireless devices.

At step 152, a range circle for each access point is calculated. In one embodiment, a range circle may be an imaginary circle used to locate wireless devices. In a further embodiment, a range circle may represent a distance between a wireless device and an access point. FIG. 3A is a diagram illustrating one embodiment of a plurality of range circles used to locate wireless devices. As illustrated, FIG. 3A includes four range circles: a range circle 210, a range circle 212, a range circle 214, and a range circle 216. Although FIG. 3A includes four range circles, any combination of two or more range circles may be used to locate wireless device 16.

In one embodiment, a range circle may be defined by a center point and a radius. In a further embodiment, the center point of a range circle may include the X and Y coordinates of the location of a respective access point, and the radius of a range circle may include the calculated distance between a wireless device and the respective access point. For example, as illustrated in FIG. 3A, range circle 210 includes a center point $(X_{210}, Y_{210})$ corresponding with the location of the access point 14 that range circle 210 represents, and further includes a radius $d_{210}$ corresponding to the calculated distance between wireless device 16 and the access point 14.

At step 154 of FIG. 2B, an intersection point of two range circles is determined. The intersection point may, in one embodiment, include two points of intersection. In one embodiment, the two points of intersection may be two different points. In another embodiment, the two points of intersection may be the same point. In a further embodiment, the two points of intersection may create two arcs. For example, as illustrated in FIG. 3A, range circles 210 and 212 intersect at points A and B. According to the illustrated embodiment, these two points of intersection create arcs 220 and 222, both of which include points A and B as their endpoints.

At step 156 of FIG. 2B, each additional range circle that intersects both arcs is determined. According to one embodiment, determining each additional range circle that intersects both arcs further includes determining the points where each additional range circle intersects each of the two arcs. For example, as illustrated in FIG. 3A, range circles 214 and 216 intersect both arcs 220 and 222. According to the illustrated embodiment, range circle 214 intersects arc 220 at point C, and arc 222 at point D. Additionally, range circle 216 intersects arc 220 at point F, and arc 222 at point E. In a further embodiment, a range circle that does not intersect both arcs may be excluded from this step of the method.

The method of FIG. 2B then moves to step 158. At step 158, a polygon is determined. According to one embodiment, determining a polygon may include determining the points that form the polygon. In one embodiment, the points that form a polygon may be the intersection points located on the two arcs. For example, as illustrated in FIG. 3A, intersection points A, B, C, D, E, and F on arcs 220 and 222 may be used to determine a polygon. In another embodiment, not all of the intersection points on the two arcs are used to determine a polygon. For example, the intersection points on the two arcs may form two separate polygons. In one embodiment, a first polygon may be formed using each internal intersection point on the two arcs, but only one of the two endpoints of the arcs. Similar to this, in one embodiment, a second polygon may be formed using each internal intersection point on the two arcs, and the other endpoint of the arcs. For example, as illustrated in FIG. 3A, each of points A and B of arcs 220 and 222 define a separate polygon. Therefore, the first polygon may include points A, E, D, C, and F as the vertices forming the polygon, but may exclude point B. Furthermore, the second polygon may include points B, D, E, F, and C as the vertices forming the polygon, but may exclude point A. Although the points of the arcs may form two polygons, according to one embodiment, only one of the two polygons is determined at one time. For example, as illustrated in FIG. 3A, polygon AEDCFA may be determined. The method of FIG. 2B then moves to step 160.

Figure 3B:
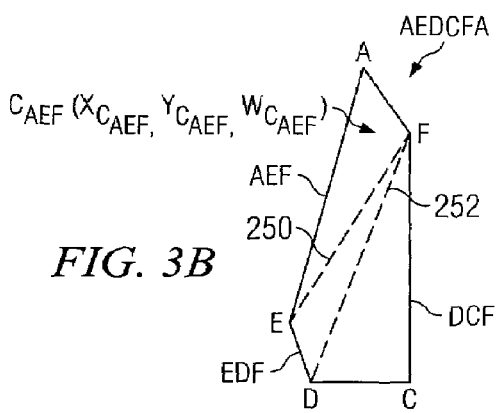
FIG. 3B is a diagram illustrating one embodiment of determining a weighted center of mass for a polygon of FIG. 2B.

At step 160, a weighted center of mass of the polygon is determined. In one embodiment, determining a weighted center of mass of the polygon includes a method of dividing the polygon up into triangles, such as triangulation or trilateration. For example, FIG. 3B is a diagram illustrating one embodiment of determining a weighted center of mass of the polygon. According to FIG. 3B, polygon AEDCFA is formed using intersection points A, E, D, C, and F of FIG. 3A as vertices of the polygon. Furthermore, polygon AEDCFA may be divided into three separate triangles: a triangle AEF, a triangle EDF, and a triangle DCF. According to the illustrated embodiment, these triangles are created using triangulation lines 250 and 252.

In one embodiment, once the polygon is divided into triangles, the weighted center of mass of each triangle is determined. This may, according to one embodiment, allow the weighted center of mass of the polygon to be determined.

According to one embodiment, the weighted center of mass of each triangle of the polygon may include X and Y coordinates of the location of the weighted center of mass of the triangle, and an assigned weight for the weighted center of mass of the triangle. For example, as illustrated in FIG. 3B, triangle AEF may include coordinates $X_{C_{AEF}}$ and $Y_{C_{AEF}}$, and an assigned weight $W_{C_{AEF}}$, the combination of which determine a weighted center of mass $C_{AEF}$ of triangle AEF. As a result, in one embodiment, determining the weighted center of mass of a triangle includes determining the X and Y coordinates of the weighted center of mass of the triangle, and the assigned weight for the weighted center of mass of the triangle.

In one embodiment, the X and Y coordinates of the weighted center of mass of a triangle may be determined using characteristics of each vertex of the triangle. In a further embodiment, the characteristics of each vertex of the triangle may include the X and Y coordinates of the vertex, and the assigned weight for the vertex. In one embodiment, the X and Y coordinates of a vertex may include the X and Y coordinates of the location of the vertex. In another embodiment, the assigned weight for a vertex may include the sum of the RSSI values of the access points whose corresponding range circles intersect at that point. For example, as illustrated in FIG. 3A, the assigned weight for vertex A of triangle AEF may include the sum of the RSSI values of the access points 14 represented in range circles 210 and 212.

In a further embodiment, the X and Y coordinates of each vertex of a triangle and the assigned weight for each vertex of a triangle may be used, in conjunction with various equations, to determine the X and Y coordinates of the weighted center of mass of the triangle. For example, according to the embodiment illustrated in FIG. 3B, the X and Y coordinates of the weighted center of mass of triangle AEF, depicted in FIG. 3B as coordinates $X_{C_{AEF}}$ and $Y_{C_{AEF}}$, may be determined according to the following equations:

$$X_{C_{AEF}} = (X_A * W_A + X_E * W_E + X_F * W_F)/(W_A + W_E + W_F) \quad (4)$$

$$Y_{C_{AEF}} = (Y_A * W_A + Y_E * W_E + Y_F * W_F)/(W_A + W_E + W_F) \quad (5)$$

According to an embodiment of the equations, $X_A$, $X_E$, and $X_F$ may be the respective X coordinates of each of the vertices A, E, and F; $Y_A$, $Y_E$, and $Y_F$ may be the respective Y coordinates of each of the vertices A, E, and F; and $W_A$, $W_E$, and $W_F$ may be the respective weights assigned to each of the vertices A, E, and F.

In another embodiment, the assigned weight for the weighted center of mass of a triangle may be determined according to another equation. For example, the assigned weight for the weighted center of mass of a triangle may be equal to the product of the area of that triangle and the sum of weights assigned to its vertices.

According to one embodiment, once the components of the weighted center of mass for each triangle in a polygon are determined, thus allowing the weighted center of mass of each triangle to be determined, the weighted center of mass for the entire polygon may also be determined. Similar to the weighted center of mass of a triangle, the weighted center of mass of a polygon may, in one embodiment, include the X and Y coordinates of the weighted center of mass of the polygon, and the assigned weight for the weighted center of mass of the polygon.

In one embodiment, the X and Y coordinates of the weighted center of mass of a polygon may be calculated according to the following equations:

$$X_G = \sum_{i=1}^{N} X_{C_i} W_{C_i} / \sum_{i=1}^{N} W_{C_i} \quad (6)$$

$$Y_G = \sum_{i=1}^{N} Y_{C_i} W_{C_i} / \sum_{i=1}^{N} W_{C_i} \quad (7)$$

According to one embodiment of the equations, $X_G$ may be the X coordinate of the weighted center of mass of the polygon, and $Y_G$ may be the Y coordinate of the weighted center of mass of the polygon. In a further embodiment, the polygon may include N triangles after triangulation; $X_{C_i}$ may be the X coordinate of the weighted center of mass of the $i^{th}$ triangle; $Y_{C_i}$ may be the Y coordinate of the weighted center of mass of the $i^{th}$ triangle; and $W_{C_i}$ may be the assigned weight for the weighted center of mass of the $i^{th}$ triangle.

For example, as illustrated in FIG. 3B, the X and Y coordinates of the weighted center of mass of polygon AEDCFA, depicted as coordinates $X_{G1}$, and $Y_{G1}$, may be determined according to the following:

$$X_{G1} = (X_{C_{AEF}} * W_{C_{AEF}} + X_{C_{EDF}} * W_{C_{EDF}} + X_{C_{DCF}} * W_{C_{DCF}})/(W_{C_{AEF}} + W_{C_{EDF}} + W_{C_{DCF}})$$

$$Y_{G1} = (Y_{C_{AEF}} * W_{C_{AEF}} + Y_{C_{EDF}} * W_{C_{EDF}} + Y_{C_{DCF}} * W_{C_{DCF}})/(W_{C_{AEF}} + W_{C_{EDF}} + W_{C_{DCF}})$$

In one embodiment, $X_{C_{AEF}}$, $X_{C_{EDF}}$, and $X_{C_{DCF}}$ may be the respective X coordinates of the weighted center of mass of triangle AEF, triangle EDF, and triangle DCF; $Y_{C_{AEF}}$, $Y_{C_{EDF}}$, and $Y_{C_{DCF}}$ may be the respective Y coordinates of the weighted center of mass of triangle AEF, triangle EDF, and triangle DCF; and $W_{C_{AEF}}$, $W_{C_{EDF}}$, and $W_{C_{DCF}}$ may be the respective weight assigned to the weighted center of mass of triangle AEF, triangle EDF, and triangle DCF.

In another embodiment, the assigned weight for the weighted center of mass of the polygon may be determined according to another equation. For example, the assigned weight for the weighted center of mass of the polygon may be equal to the product of the area of that polygon and the sum of weights assigned to its vertices.

Using the X and Y coordinates of the weighted center of mass of the polygon, and the assigned weight for the weighted center of mass of the polygon, the weighted center of mass of the polygon may be determined. Once the weighted center of mass of the polygon is determined, the method of FIG. 2B moves to step 162. At step 162, steps 158 and 160 are repeated for each polygon. In one embodiment, as discussed above, the points of intersection of the arcs may form two separate polygons. In such an embodiment, step 162 includes repeating steps 158 and 160 for the second polygon. According to one embodiment illustrated in FIG. 3A, steps 158 and 160 may be repeated for polygon BDEFCB.

At step 164 of FIG. 2B, a vertex of a location polygon is determined. In one embodiment, the vertex may be determined by comparing the determined weighted center of mass of each of the polygons. For example, as illustrated in FIG. 3A, the vertex of a location polygon may be determined by comparing the weighted center of mass of polygon AEDCFA with the weighted center of mass of polygon BDEFCB. As a further example, the weighted center of mass of polygon AEDCFA, depicted as G1, may be determined to be the vertex of the location polygon if |AG1| is less than |BG2|. In a further embodiment, if |AG1| is not less than |BG2|, the weighted center of mass of polygon BDEFCB, depicted as G2, may be determined to be the vertex of the location polygon.

In another embodiment, a vertex of a location polygon may be determined according to an alternate method. For example, with reference to step 156 of FIG. 2B, if no additional range circles intersect the two arcs at points other than the endpoints of the arcs, a weighted mid point of a chord connecting the two endpoints may be determined. For example, according to the embodiment illustrated in FIG. 3A, a weighted mid point of a chord connecting endpoints A and B may be determined. In one embodiment, the weighted mid point of the chord may be the vertex of the location polygon. As another example, with reference to step 154 of FIG. 2B, if the two points of intersection coincide, the coinciding points of intersection may be the vertex of the location polygon.

At step 166 of FIG. 2B, steps 154 through 164 are repeated for each combination of two range circles. According to one embodiment, a possible amount of combinations of two range circles may be equal to N(N−1)/2. According to this embodiment, N may be the amount of access points 14. In a further embodiment, any combination of two range circles that do not intersect each other at a real point may not considered for this step of method FIG. 2B. In another embodiment, in order to improve the accuracy and speed of calculations, any range circle that represents an access point with a weak signal strength may not be considered for this step of method FIG. 2B.

By repeating steps 154 through 166 for each combination of two range circles, in one embodiment, each vertex of the location polygon may be determined. The method of FIG. 2B then moves to step 168. At step 168, the location polygon is determined. In one embodiment, the location polygon may be formed by the determined vertices of the location polygon.

At step 170 of FIG. 2B, a weighted center of mass of the location polygon is determined. According to one embodiment, this determination may be substantially similar to step 160 of FIG. 2B, wherein a weighted center of mass of the polygon is determined. According to one embodiment, the weighted center of mass of the location polygon may be the location of a wireless device. In a further embodiment, the weighted center of mass of the location polygon may be the location of wireless device 16. At step 172, the method of FIG. 2B ends.

Although FIG. 2B describes one embodiment of a method for locating wireless devices, the method of FIG. 2B may be performed using any other suitable steps and/or equations. For example, any suitable equation or method for determining the weighted center of mass of a polygon may be used. Furthermore, the steps of FIG. 2B may be performed in any suitable order and may be performed at substantially the same time. For example, the process of repeating steps 154 through 166 for each combination of two range circles may occur at substantially the same time.

In a further embodiment of FIG. 2B, the X and Y coordinates of a location, such as the location of a wireless device, may be determined using a filter capable of removing the measurement noise components and increasing the estimation accuracy. For example, the X and Y coordinates of a location may be determined using a Kalman filter. In one embodiment, a Kalman filter may be used to determine a weighted center of mass of a triangle, a weighted center of mass of a polygon, and a weighted center of mass of the location polygon. As a result, a Kalman filter may be used to remove measurement noise components and to increase the accuracy of determining the location of wireless devices.

In another embodiment, with reference to step 154 of FIG. 2B, even if none of the range circles intersect each other, the location of wireless devices may still be determined. In such an embodiment, three non-overlapping range circles representing the three access points with the strongest signals are determined. Once determined, the radii of the range circles may be increased slowly until at least two of the range circles intersect each other. According to one embodiment, the radii of the range circles may be increased by a constant factor, and in a step by step fashion. Once at least two of the range circles intersect each other, in one embodiment, the weighted mid point of a chord of the intersection may be determined. According to one embodiment, this mid point of the chord may be the location of the wireless device, such as wireless device 16.

In a further embodiment, although FIGS. 2A and 2B describe a method of determining a location of wireless devices in two dimensions, the method may include determining a location of wireless devices in three dimensions. In such an embodiment, determining a location of wireless devices may include X, Y, and Z coordinates.

Figure 4:
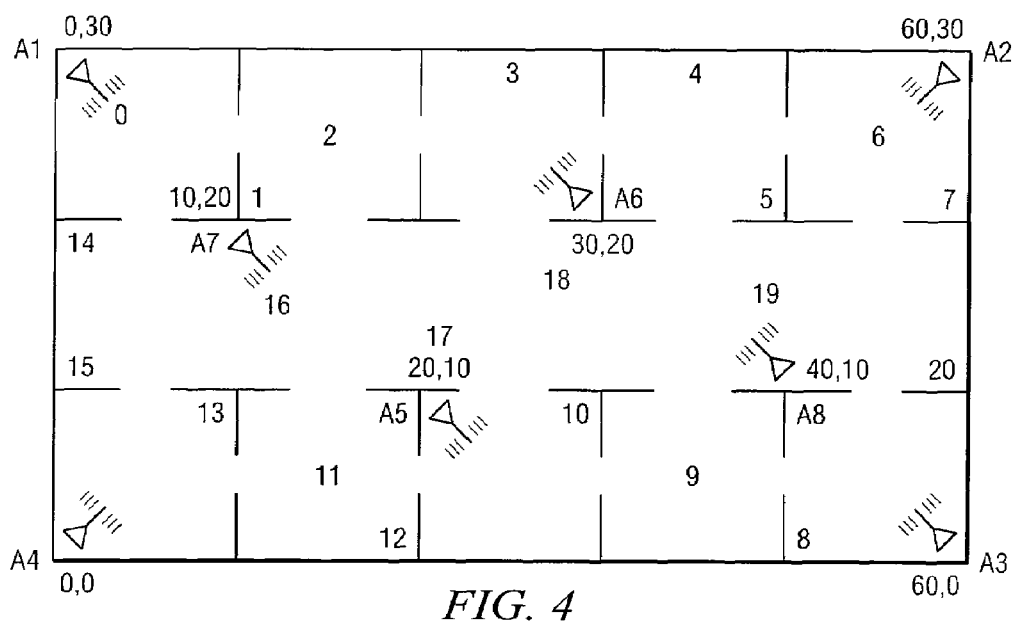
FIGS. 4-12 illustrate an example of a potential test run of one embodiment of the present invention.

FIGS. 4-12 illustrate an example of a test run of one embodiment of the present invention. FIG. 4 is an illustration of a third floor of an office building used as the environment for testing. As illustrated in FIG. 4, a wireless device was moved to positions 0 to 20.

According to the illustrated embodiments, each of FIGS. 5-12 may refer to an average error in estimation of a location of a wireless device. In one embodiment, the average error in estimation may be determined according to the following equation:

$$\sum_{i=1}^{n} \left| D_i - \sqrt{(X_i - X_{estimated})^2 + (Y_i - Y_{estimated})^2} \right| / n \quad (8)$$

In one embodiment of the equation, n may be the total number of observed access points; $X_i$ and $Y_i$ may denote the location of the $i^{th}$ access point; and $D_i$ may be the actual distances between the $i^{th}$ access point and the wireless device.

Figure 5:
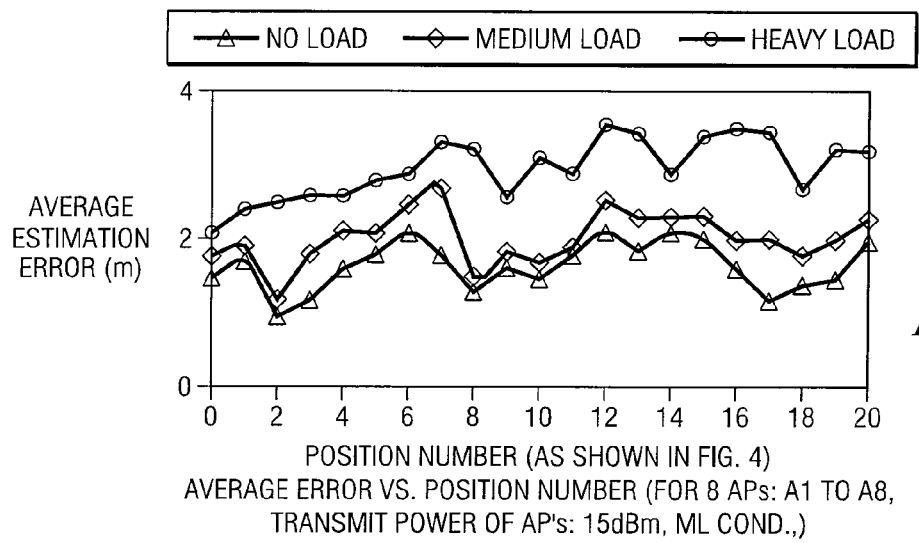
Figure 6:
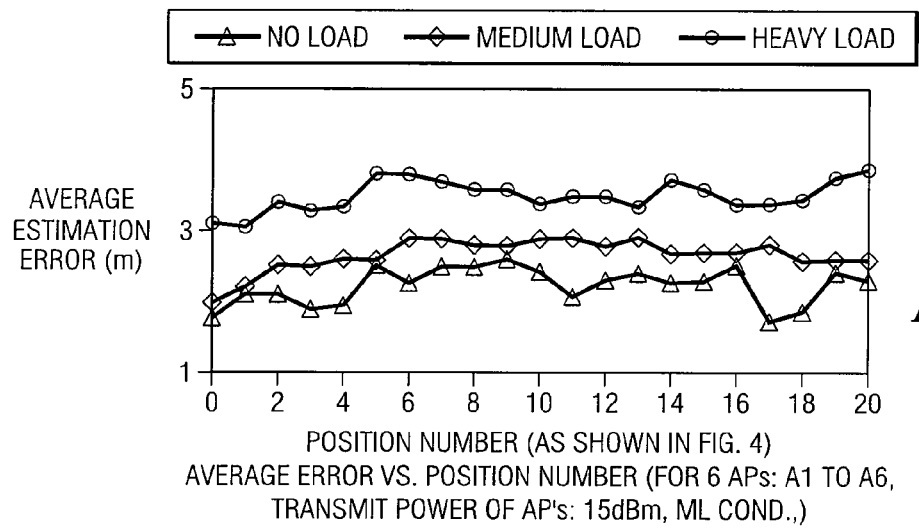
Figure 7:
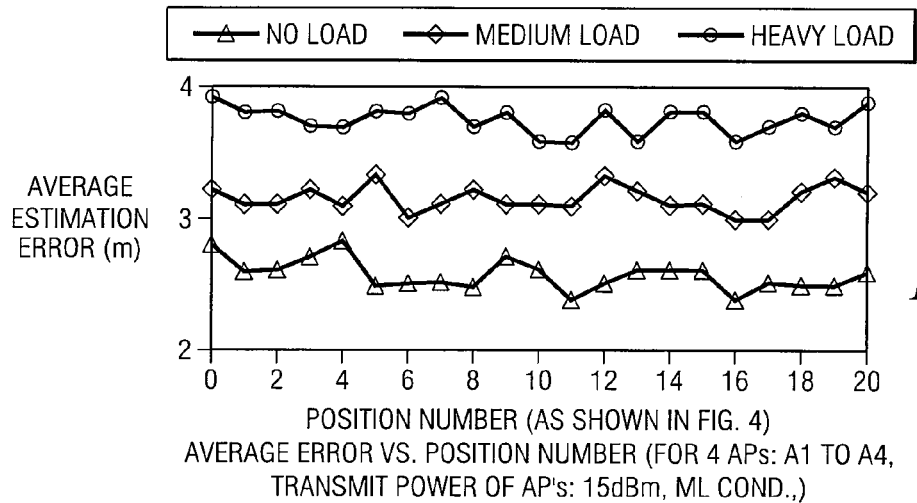

FIGS. 5-7 illustrate example graphs indicating an average error in estimation of a location of a wireless device at positions 0-20, and further illustrate the average error in estimation of a location of a wireless device in three different environmental conditions: No Load, Medium Load, and Heavy Load. In particular, FIG. 5 illustrates an example graph of a test run using eight access points; FIG. 6 illustrates an example graph of a test run using six access points; and FIG. 7 illustrates an example graph of a test run using four access points.

Figure 8:
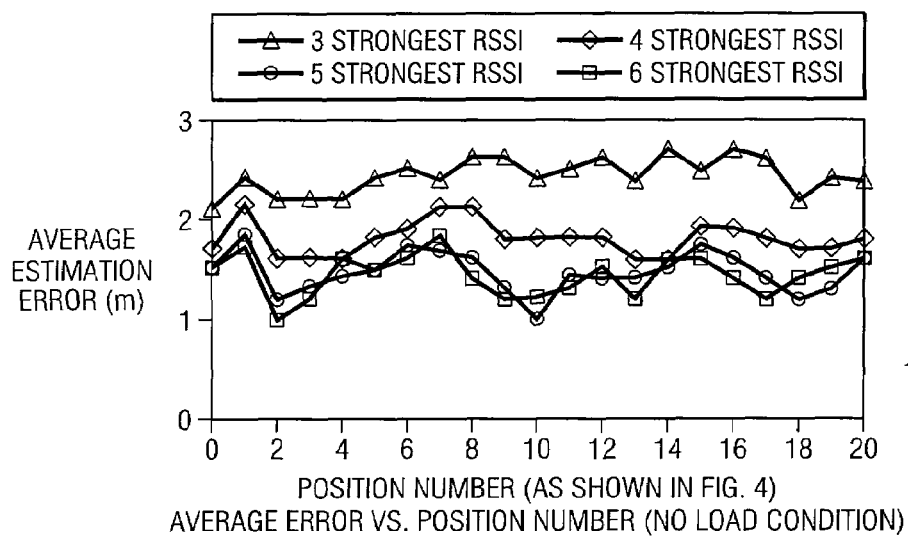
Figure 9:
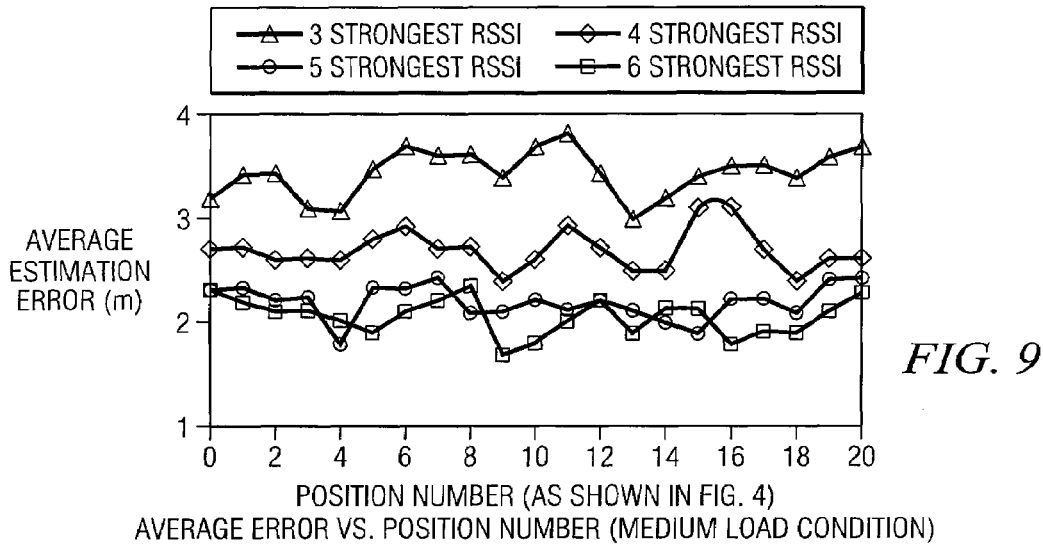
Figure 10:
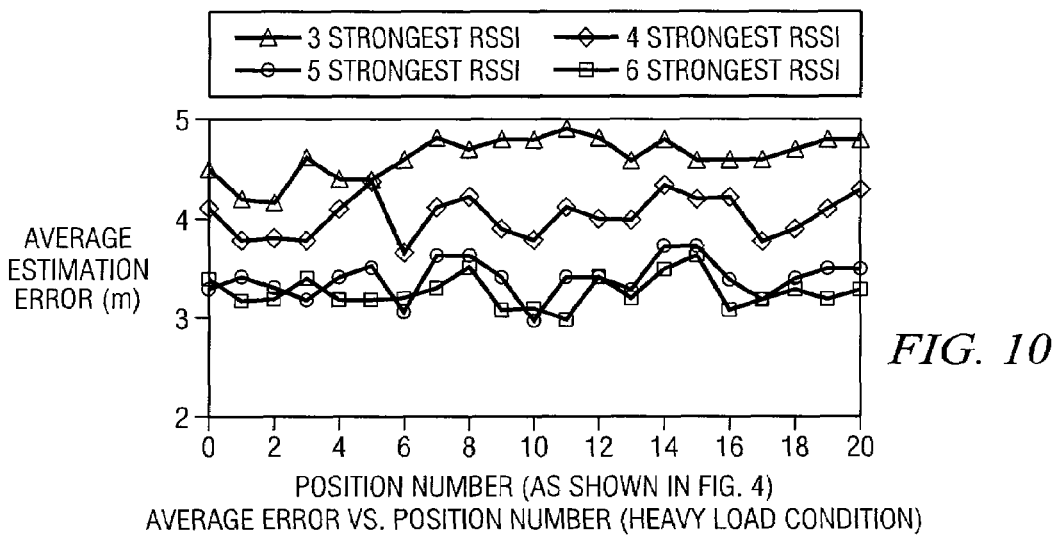

FIGS. 8-10 illustrate an average error in estimation of a location of a wireless device at positions 0-20, and further illustrate the average error in estimation of a location of a wireless device when the location of the wireless device is determined using the three strongest RSSI signals received by the wireless device, the four strongest RSSI signals received by the wireless device, the five strongest RSSI signals received by the wireless device, and the six strongest RSSI signals received by the wireless device. In particular, FIG. 8 illustrates an example graph of a test run conducted under a No Load condition; FIG. 9 illustrates an example graph of a test run conducted under a Medium Load condition; and FIG. 10 illustrates an example graph of a test run conducted under a Heavy Load condition.

Figure 11:
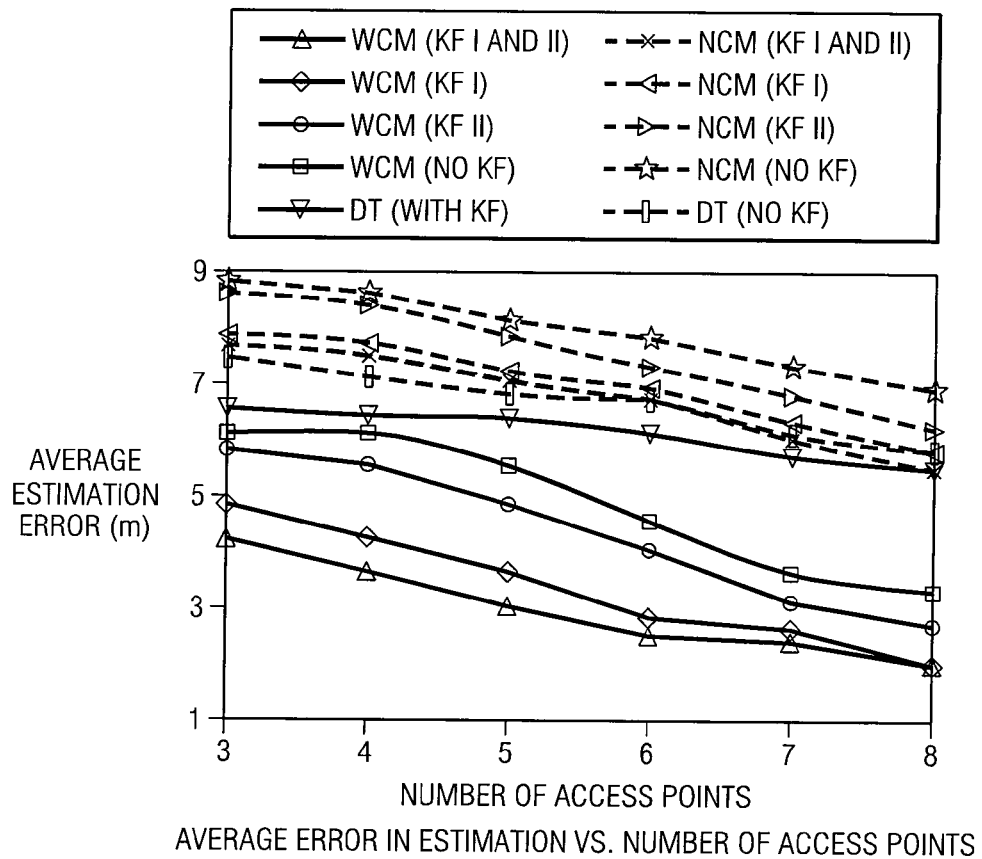

FIG. 11 illustrates an average error in estimation of a location of a wireless device based on the number of access points used, and further illustrates the average error of a location of a wireless device when the location of the wireless device is determined using a Weighted center of mass based trilateration approach (WCM), a Normal center of mass based trilateration approach (NCM), and a differential triangulation (DT) algorithm. As illustrated in FIG. 11, the average error in estimation is further broken up into different categories. For example, WCM and NCM are each broken up into categories where: (1) Kalman filtering is used in the calculation of a distance between a wireless device and an access point (KF I); (2) Kalman filtering is used in the determining of a location of a wireless device (KF II); (3) Kalman filtering is used in both the calculation of a distance between a wireless device and an access point, and the determining of a location of a wireless device (KF I & II); and (4) Kalman filtering is not used (No KF). As further illustrated, DT is also broken up into different categories. For example, DT is broken up into categories where: (1) Kalman filter is used (with KF); and (2) Kalman filtering is not used (No KF).

Figure 12:
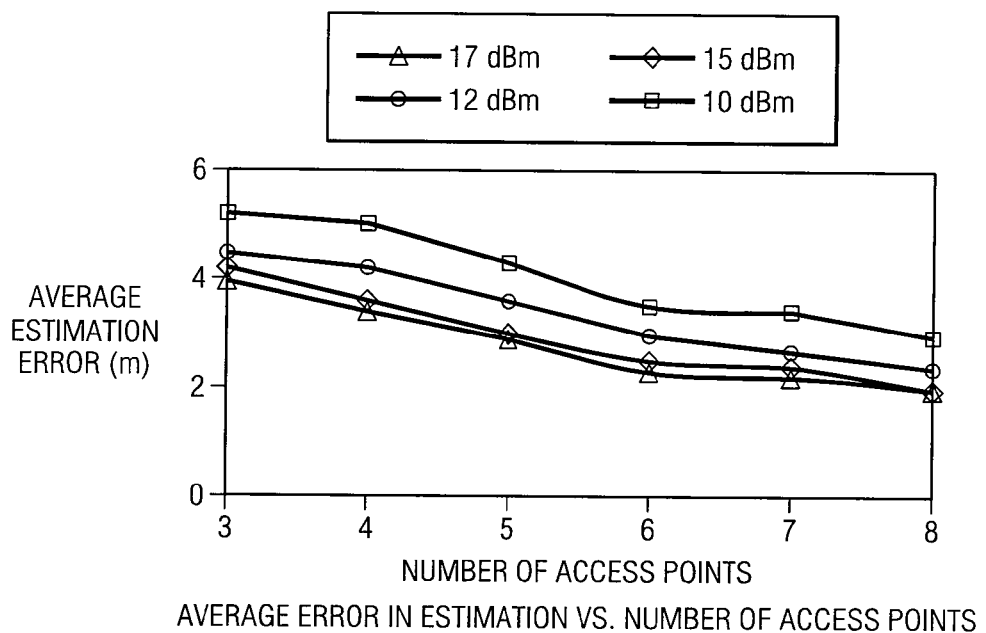

FIG. 12 illustrates an average error in estimation of a location of a wireless device based on the transmit power of each of the access points. FIG. 12 further illustrates the average error in estimation of a location of a wireless device based on the number of access points used.

Although embodiments of the invention and its advantages are described in detail, a person skilled in the art could make various alterations, additions, and omissions without departing from the spirit and scope of the present invention as defined by the appended claims.

What is claimed is:

1. A method for locating a wireless device, comprising:
   for each access point of a plurality of access points:
   receiving, at a managing device, an indication of a strength of a signal received by a wireless device from the access point; and
   calculating, at the managing device, a distance between the wireless device and the access point using at least the indication of the strength of the signal; and
   determining, at the managing device, a probable location of the wireless device using at least each of the calculated distances, the determining comprising:

determining a plurality of polygons defined by the wireless device and the plurality of access points; and calculating a weighted center of mass of each polygon of the plurality of polygons, the weighted center of mass of each polygon determined using an assigned weight for a vertex of the polygon;

wherein calculating the weighted center of mass comprises using at least a sum of the indications of the strength of the signals received at the managing device.

2. The method of claim 1, wherein the probable location of the wireless device comprises the probable location of the wireless device in an indoor environment.

3. The method of claim 1, wherein respective locations of each of the plurality of access points, are used to determine the probable location.

4. The method of claim 1, wherein a weighted center of mass of one of the polygons comprises the probable location of the wireless device.

5. The method of claim 1, wherein determining, at the managing device, the probable location of the wireless device further comprises:

determining a subset of the weighted centers of mass;

determining a location polygon using the subset; and calculating the weighted center of mass of the location polygon, wherein the weighted center of mass of the location polygon comprises the probable location of the wireless device.

6. The method of claim 1, wherein determining, at the managing device, the probable location of the wireless device comprises using a Kalman filter.

7. The method of claim 1, wherein calculating, at the managing device, a distance between the wireless device and the access point comprises using a Kalman filter.

8. The method of claim 1, wherein determining, at the managing device, the probable location of the wireless device further comprises:

calculating a range circle for each access point of the plurality of access points;

determining a plurality of intersection points between two of the range circles; and calculating a weighted midpoint of a chord between the plurality of intersection points, wherein the weighted midpoint of the chord comprises the probable location of the wireless device.

9. The method of claim 1, wherein determining, at the managing device, a probable location of the wireless device comprises:

using a location of each access point of the plurality of access points;

determining a plurality of polygons;

calculating a weighted center of mass of each polygon of the plurality of polygons;

determining a subset of the weighted centers of mass;

determining a location polygon using the subset; and calculating the weighted center of mass of the location polygon, wherein the weighted center of mass of the location polygon comprises the probable location of the wireless device, wherein the probable location of the wireless device comprises the probable location of the wireless device in an indoor environment; and wherein calculating, at the managing device, a distance between the wireless device and the access point further comprises using a Kalman filter.

10. A system for locating wireless devices, comprising:

a managing device comprising:

a processor:

an interface operable to receive, for each access point of a plurality of access points, an indication of a strength of a signal received by a wireless device from the access point; and a storage device embodying a program of instructions operable, when executed on the processor, to:

calculate, for each access point of the plurality of access points, a distance between the wireless device and the access point using at least the indication of the strength of the signal; and determine a probable location of the wireless device using at least each of the calculated distances, the determining comprising:

determine a plurality of polygons defined by the wireless device and the plurality of access points; and calculate a weighted center of mass of each polygon of the plurality of polygons, the weighted center of mass of each polygon determined using an assigned weight for a vertex of the polygon;

wherein calculating the weighted center of mass comprises using at least a sum of the indications of the strength of the signals received at the managing device.

11. The system of claim 10, wherein the probable location of the wireless device comprises a location of the wireless device in an indoor environment.

12. The system of claim 10, wherein the program of instructions is further operable to determine the probable location of the wireless device using a location of each access point of the plurality of access points.

13. The system of claim 10, wherein the program of instructions is further operable to determine the probable location of the wireless device by:

determining a subset of the weighted centers of mass;

determining a location polygon using the subset; and calculating the weighted center of mass of the location polygon, wherein the weighted center of mass of the location polygon comprises the probable location of the wireless device.

14. The system of claim 10, wherein the program of instructions is further operable to determine the probable location of the wireless device by using a Kalman filter.

15. The system of claim 10, wherein the program of instructions is further operable to calculate, for each access point of the plurality of access points, a distance between the wireless device and the access point using a Kalman filter.

16. A system for locating wireless devices, comprising:

means for receiving, for each access point of a plurality of access points, an indication of a strength of a signal received by a wireless device from the access point;

means for calculating, for each access point of the plurality of access points, a distance between the wireless device and the access point using at least the indication of the strength of the signal;

means for determining a probable location of the wireless device using at least each of the calculated distances;

means for determining a plurality of polygons defined by the wireless device and the plurality of access points; and means for calculating a weighted center of mass of each polygon of the plurality of polygons, the weighted center of mass of each polygon determined using an assigned weight for a vertex of the polygon;

wherein calculating the weighted center of mass comprises using at least a sum of the indications of the strength of the signals received at the managing device.

17. Logic encoded in a computer-readable media, the logic being operable, when executed on a processor, to:

receive, for each access point of a plurality of access points, an indication of a strength of a signal received by a wireless device from the access point;

calculate, for each access point of the plurality of access points, a distance between the wireless device and the access point using at least the indication of the strength of the signal; and determine a probable location of the wireless device using at least each of the calculated distances, the determining comprising:

determining a plurality of polygons defined by the wireless device and the plurality of access points; and calculating a weighted center of mass of each polygon of the plurality of polygons, the weighted center of mass of each polygon determined using an assigned weight for a vertex of the polygon;

wherein calculating the weighted center of mass comprises using at least a sum of the indications of the strength of the signals received at the managing device.

* * * * *